T. A. HUTSELL.
SHOCK ABSORBER.
APPLICATION FILED APR. 30, 1918.
1,334,455. Patented Mar. 23, 1920.
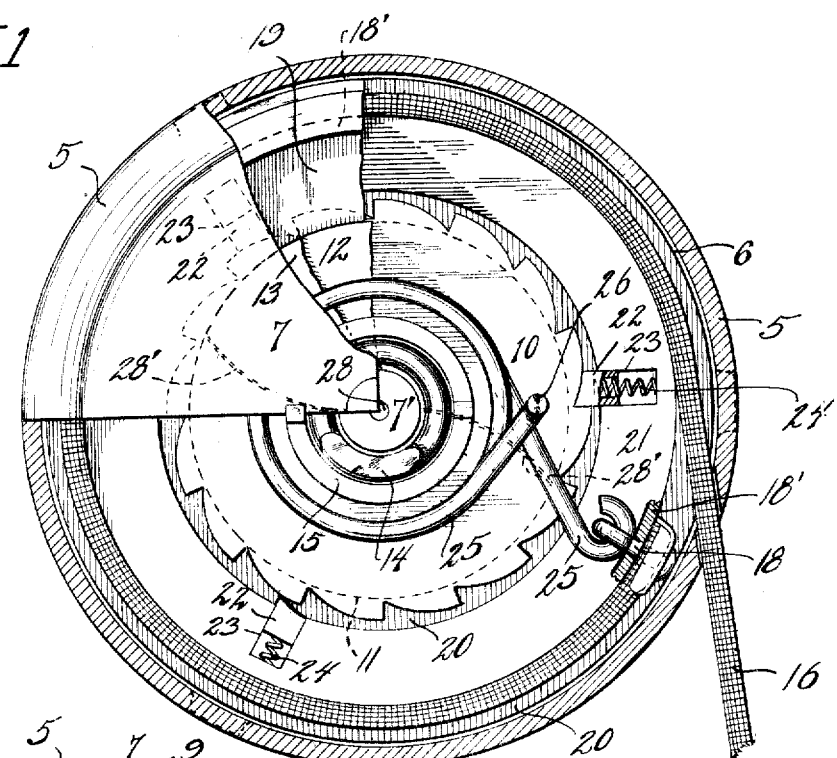
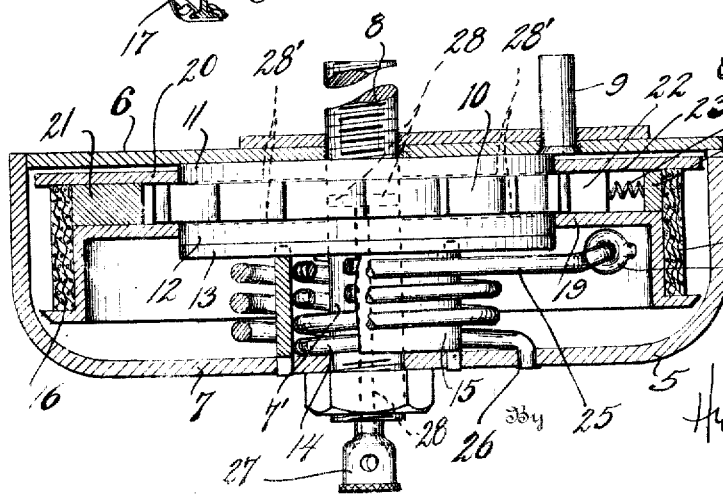
Inventor
Thomas A. Hutsell
By Herbert E. Smith
Attorney

UNITED STATES PATENT OFFICE.

THOMAS A. HUTSELL, OF SPOKANE, WASHINGTON, ASSIGNOR TO WRIGHT REBOUND SNUBBER COMPANY, OF SPOKANE, WASHINGTON.

SHOCK-ABSORBER.

1,334,455.

Specification of Letters Patent.

Patented Mar. 23, 1920.

Application filed April 30, 1918. Serial No. 231,656.

*To all whom it may concern:*

Be it known that I, THOMAS A. HUTSELL, a citizen of the United States, residing at Spokane, in the county of Spokane and State of Washington, have invented certain new and useful Improvements in Shock-Absorbers, of which the following is a specification.

The present invention relates to improvements in shock absorbers, of the snubber type, designed for the purpose of equalizing and reducing the vibrations and jars to which an automobile or other vehicle is subjected when traveling over rough roads, etc. The primary object of the invention is the provision of a device for this purpose, of the friction type involving the use of springs, which will be durable and efficient, and comparatively inexpensive in cost of production.

The invention consists essentially in certain novel combinations and arrangements of friction disks with a ratchet wheel of a revoluble reel or spool that is connected to a fixed part, an axle of the automobile, by a belt, and in certain other minor combinations as will be hereinafter pointed out and claimed.

In the accompanying drawings one complete example of the physical embodiment of the invention is illustrated, constructed and arranged according to the best mode so far devised for the practical application of the principles of the invention.

Figure 1 is a view of the device, partly in section and partly in elevation.

Fig. 2 is a transverse sectional view through the housing or casing and also through the operating parts of the device.

Fig. 3 is a view showing the application of the device to the frame bar and axle of an automobile.

Fig. 4 is a view showing the device attached to the opposite side of the frame bar to that of Fig. 3.

In the preferred embodiment of the invention as illustrated in the drawings the device is shown applied in Fig. 3 to the outside of the channel member 1 of the automobile frame, and in Fig. 4 to the inside of the channel member 2, these members of course forming part of the chassis or frame of an automobile or other vehicle. In both these views the axle of the car is designated 3 and the spring is indicated by the numeral 4, and it will readily be apparent that the shock absorber is designed to take up motion between these two parts the frame and the axle, and prevent excessive jars or bumps by absorbing, to a great extent, the movement of these parts in relation to each other.

The device is inclosed and protected within a metallic cup shaped housing 5 whose base plate 6 and closed end 7 support the fixed center bar 7; and by means of this bar, which is threaded at 8, the housing and bar are fixed in the channel frame against rotation, a stud 9 being also employed to insure non-rotation of the housing and fix the housing to the channel bar.

Within the housing, and loosely supported on the center bar 7' is a ratchet wheel 10, and at each side of the ratchet wheel is located a friction disk as 11 and 12, being of course of smaller diameter than the ratchet but in close frictional contact therewith. These disks are also loose on the bar or shaft 7', one being located between the base plate 6 and the ratchet wheel, and the other being located between a washer 13 and the ratchet wheel, and a protractile spring 14, coiled about the shaft, is interposed between this washer and the closed end 7 of the housing, a tubular sleeve 15 inclosing the spring and positively separating the friction members and the cup. The spring is of sufficient strength to urge close frictional contact between the smooth faces of the ratchet and its friction disks, in order to retard any movement of the ratchet.

Upon the peripheries of the two friction disks is supported a sheave upon which the belt 16 is wound, and the belt is made of suitable flexible material with one end attached to the axle 3 as at 17 and its other end attached to the sheave by an eye bolt 18 passed through the flange 18' of the sheave. The web 19 of the sheave has an open center and is fitted over the disk 12 while a similar web 20 of the sheave has its open center fitted over the disk 11. An additional web or open ring 21 completes the sheave and this web is intermediate of the two webs 19 and 20, all three webs of course being rigid with each other, and the intermediate web carries three spring pressed pawls 22 seated in sockets 23 on the springs 24 which urge the pawls into contact with the teeth of the ratchet wheel. The pawls are spaced about the periphery of the ratchet to insure the engagement at all times of one of them, as indicated in Fig. 1, and through the pawls and the coiled spring 25 having one end attached to the eye bolt 18 and its other end attached at 26, the slack of the belt is taken up and it is held in a normally taut position. The friction members are lubricated from the oil cup 27 through a duct 28 (dotted lines) Fig. 2, and radial ducts 28' Fig. 2, to prevent excessive and undue wear.

Claims—

1. The combination with the housing and its fixed shaft, of a ratchet wheel, friction disks at its sides, a friction spring holding these elements in close contact, a loose sheave on the disks, a belt attached thereto and adapted to turn the sheave, a return spring connecting the belt and housing, and spring pressed pawls carried by the sheave to engage the ratchet wheel.

2. The combination with the fixed housing and its fixed shaft of a member loose on the shaft, a friction disk at each side of said member, means between the housing and disk for holding these members in close frictional contact, a sheave supported loosely on the disks, means for operatively connecting the sheave with the loose member, a draw belt attached to the sheave, and a return spring connected to the sheave and housing.

3. The combination with the fixed housing and its fixed shaft, of three friction members loose thereon, a spring between said members and the housing for holding them in frictional contact, a sheave loosely supported on the two outside members, a belt on the sheave, a return spring between the sheave and housing, and means for operatively connecting said sheave and the intermediate friction member.

4. The combination in a shock absorber having a fixed shaft and housing, of a ratchet wheel, a friction disk at each side thereof, means for holding the wheel and disks in frictional contact and against the housing, a loose spring returned sheave on the disks, a belt attached thereto and adapted to turn the sheave, and means for operatively connecting the sheave and ratchet wheel.

5. The combination in a shock absorber having a fixed shaft and housing, of a ratchet wheel loose on the shaft, friction disks at its sides, means for holding these members in frictional contact against the housing, a sheave supported loosely on the disks, spring pressed pawls carried by the sheave to engage the ratchet wheel, a draw belt attached to the sheave, and a return spring connected to the sheave and housing.

In testimony whereof I affix my signature.

THOMAS A. HUTSELL.